United States Patent [19]

Miyasaka et al.

[11] Patent Number: 5,718,056
[45] Date of Patent: Feb. 17, 1998

[54] TAPE MEASURE

[75] Inventors: Tokuro Miyasaka; Hideyuki Kato; Toshio Yasunaga; Hiroyasu Watanabe, all of Tokyo, Japan

[73] Assignee: Yamayo Measuring Tools Co., Ltd., Tokyo, Japan

[21] Appl. No.: 600,634

[22] Filed: Feb. 13, 1996

[30] Foreign Application Priority Data

Feb. 15, 1995 [JP] Japan .................. 7-001661 U

[51] Int. Cl.[6] ........................................ G01B 3/10
[52] U.S. Cl. .................. 33/761; 33/769; 242/395.1
[58] Field of Search ......................... 33/393, 754, 755, 33/761, 769; 242/395.1

[56] References Cited

U.S. PATENT DOCUMENTS

| 1,555,167 | 9/1925 | Switzer ................... 242/395.1 |
| 3,261,567 | 7/1966 | Quenot ................... 242/395.1 |
| 3,918,657 | 11/1975 | Hawker et al. ............ 242/395.1 |
| 5,042,159 | 8/1991 | Millen ..................... 33/414 |
| 5,448,837 | 9/1995 | Han-Teng ................. 33/761 |

FOREIGN PATENT DOCUMENTS

| 1271129 | 7/1961 | France ................... 242/395.1 |
| 2135969 | 9/1984 | United Kingdom ........... 33/755 |

Primary Examiner—William A. Cuchlinski, Jr.
Assistant Examiner—Andrew Hirshfeld
Attorney, Agent, or Firm—Armstrong, Westerman, Hattori, McLeland & Naughton

[57] ABSTRACT

A tape measure is provided which has less rotational wearing and trouble, increased reliability of cooperative rotation, and an easier assembling and disassembling structure. The tape measure is characterized in that a unitized gear mechanism can be taken out from outside, and a sub-rotary disc axis member and a take-up drive can be rotated together.

1 Claim, 3 Drawing Sheets

TAPE MEASURE

BACKGROUND OF THE INVENTION

1. Field of the Invention

The present invention relates to a quick take-up tape measure based on a doubled velocity structure using a planetary gear mechanism.

2. Description of Related Art

A conventional quick take-up tape measure based on a doubled velocity structure using a planetary gear mechanism is disclosed in Japanese Published Utility Model No. 4-242.

Characteristic features of the above-mentioned conventional tape measure are as follows:

(1) The inside of the gear box space is capped by an independent capping plate which rotates by a take-up drum at the same velocity as that of a take-up handle;

(2) A sub-rotary disc axis member and the take-up drum are connected by fitting a square axis and a square hole; and (3) A bearing member, integrally provided with an annulus, is fixed to a frame or casing by means of a screw from a back side surface or an inside thereof.

Such a conventional tape measure has the following disadvantages.

Because of the structure described in paragraph (1) above, a velocity differential occurs between the capping plate, rotating at the same velocity as the take-up handle, and the take-up drum, rotating at a doubled velocity through planetary gears, when the take-up handle is rotated. Therefore, it is necessary to intentionally leave a gap between the plate and the drum, which would result in any one of: frictional wear; breakage in a narrow gap thereof; and mechanical trouble due to penetration of soil or dust in a broad gap thereof.

Because of the structure described in paragraph (2) above, complete cooperation of rotation between the sub-rotary disc axis member and the take-up drum would be lost when corners of the square axis become worn with the passage of time. This phenomenon easily occurs under a severe conditions such as where a high velocity (i.e., the doubled velocity) is forced on the device.

Because of the structure described in paragraph (3) above, the frame or casing should be dismounted when gear parts used in the device are assembled or disassembled.

It is an object of the present invention to solve the problems described above of the conventional tape measure and to provide a novel tape measure.

SUMMARY OF THE INVENTION

An object of the present invention is to provide a tape measure which includes:

a frame including a tape measure housing space between front and rear members and having a bearing supporting hole and a smaller bearing hole formed opposingly thereon, respectively;

a ring-like bearing member formed independently of the frame and integrally provided with a fitting flange and an inward collar portion on outer and inner peripheries thereof, respectively, the bearing member being inserted into the bearing supporting hole from the outside so as to fit the fitting flange to an outer surface of a cut-end portion of the supporting hole by means of second screws;

a main rotary disc axis member provided with a take-up handle fitted on an outside surface and a first short axis integrally formed in a center of an inside surface thereof and rotatably inserted into a larger bearing hole formed on an outer surface of the inward collar portion of the bearing member;

a sub-rotary disc axis member provided with a bearing hole in a center thereof and arranged opposingly to the main rotary disc axis member in the inward collar portion to fit the first short axis in the bearing hole, the sub-rotary disc axis member being rotatably fixed to the main rotary disc axis member by means of an anti-departing plate by screwing a third screw to an end surface of the first short axis, thereby forming gear box space surrounded by the main and sub-rotary disc axis members, as well as the inward collar portion;

an annulus formed on an inner peripheral edge portion of the collar portion and a sun gear centering around the first short axis integrally formed on a side peripheral edge portion of the sub-rotary disc axis member within the gear box space;

plural planetary gears fitted by means of bearing axes integrally formed on a side surface of the main rotary disc axis member within the gear box space, the planetary gears being intermeshed with the annulus and the sun gear to rotate;

a take-up drum arranged between the sub-rotary disc axis member and the rear member and provided with a second short axis integrally formed around a side surface center of the drum opposingly to the rear member, the second short axis being rotatably inserted into the smaller bearing hole; and an oblong concave portion formed on a side surface of the take-up drum opposingly to sub-rotary disc axis member and separated lateral convex portions formed across a central longitudinal axis of the main rotary disc axis member on a side surface of the sub-rotary disc axis member opposingly to the take-up drum, the concave portion and the convex portions being detachably fitted with respect to each other.

Because of the above-mentioned structure of the present tape measure, the sub-rotary disc axis member, which also functions as a conventional capping plate when the take-up handle is rotated, and the take-up drum are rotated together at a doubled velocity by means of the planetary gears. Accordingly, it is not necessary to intentionally leave a gap between the sub-rotary disc axis member and the take-up drum. Such an improved structure of the present invention can prevent problems or rotational wearing caused by the penetration of soil or dust in the gap. Further, as the sub-rotary disc axis member and the take-up drum are connected by fitting the lateral convex portions and the oblong concave portion, complete cooperation of rotation thereof can be achieved by the above-mentioned structure. On the other hand, as the gear system is assembled as a unit and the unit thus assembled is detachably hinged from outside by means of the third screw, assembling or disassembling of the whole device and replacement of parts, such as gears, is quite easy.

BRIEF DESCRIPTION OF THE DRAWING FIGURES

DETAILED DESCRIPTION OF THE PREFERRED EMBODIMENT

Figure 1:
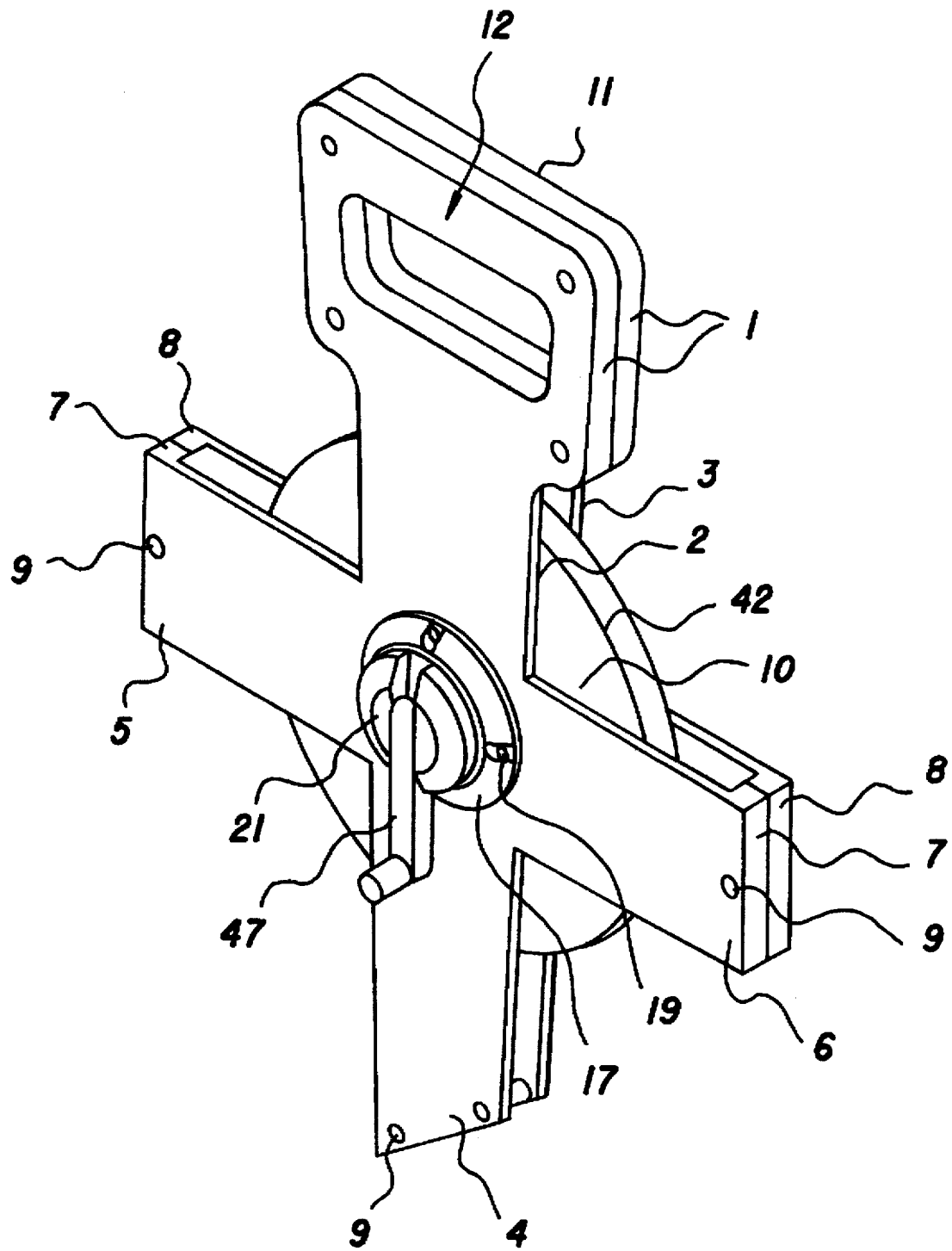
FIG. 1 is a perspective view of an embodiment of the tape measure of the present invention.
Figure 2:
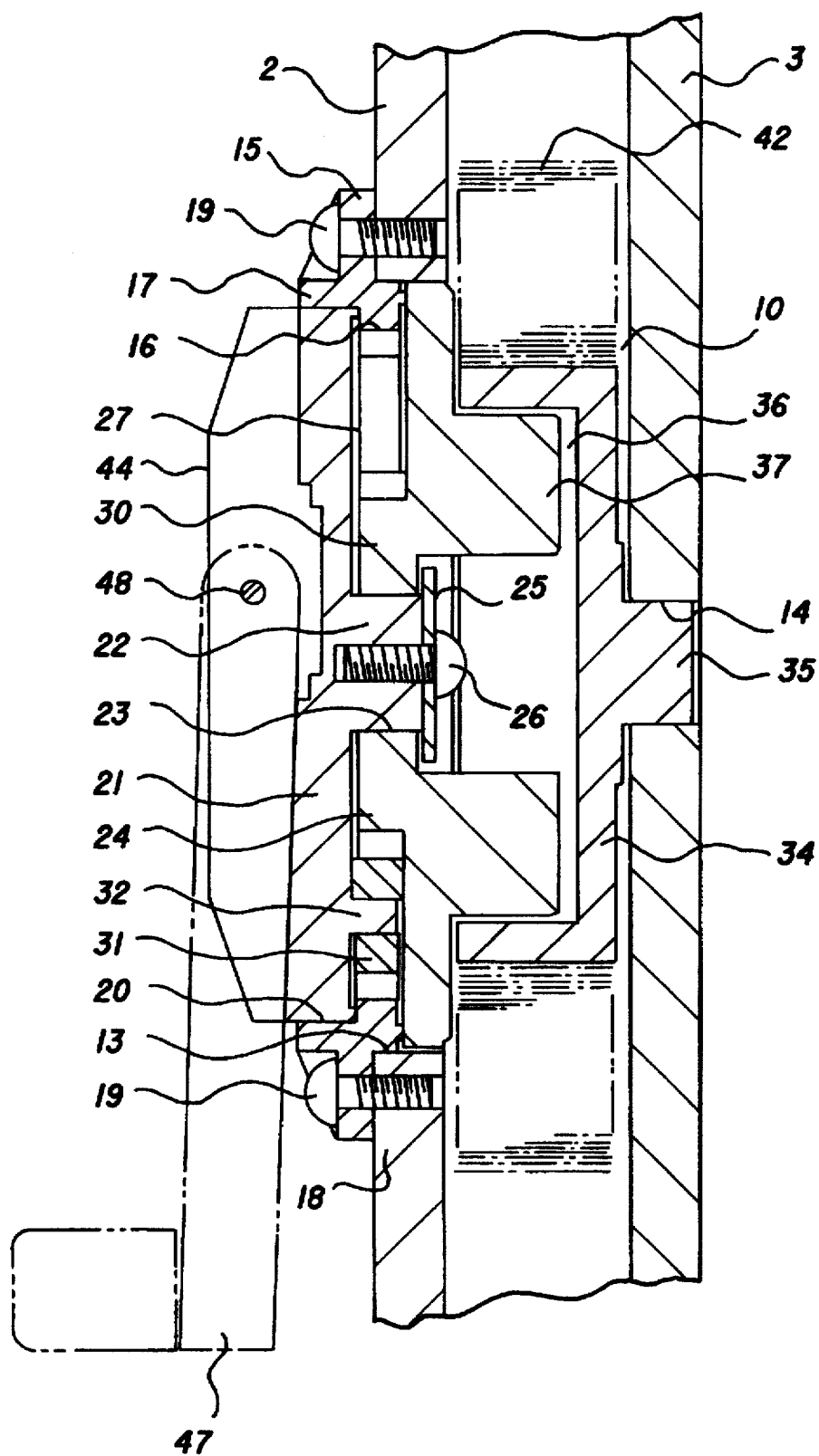
FIG. 2 is a cross-sectional view of a major part of the tape measure of the present invention.
Figure 3:
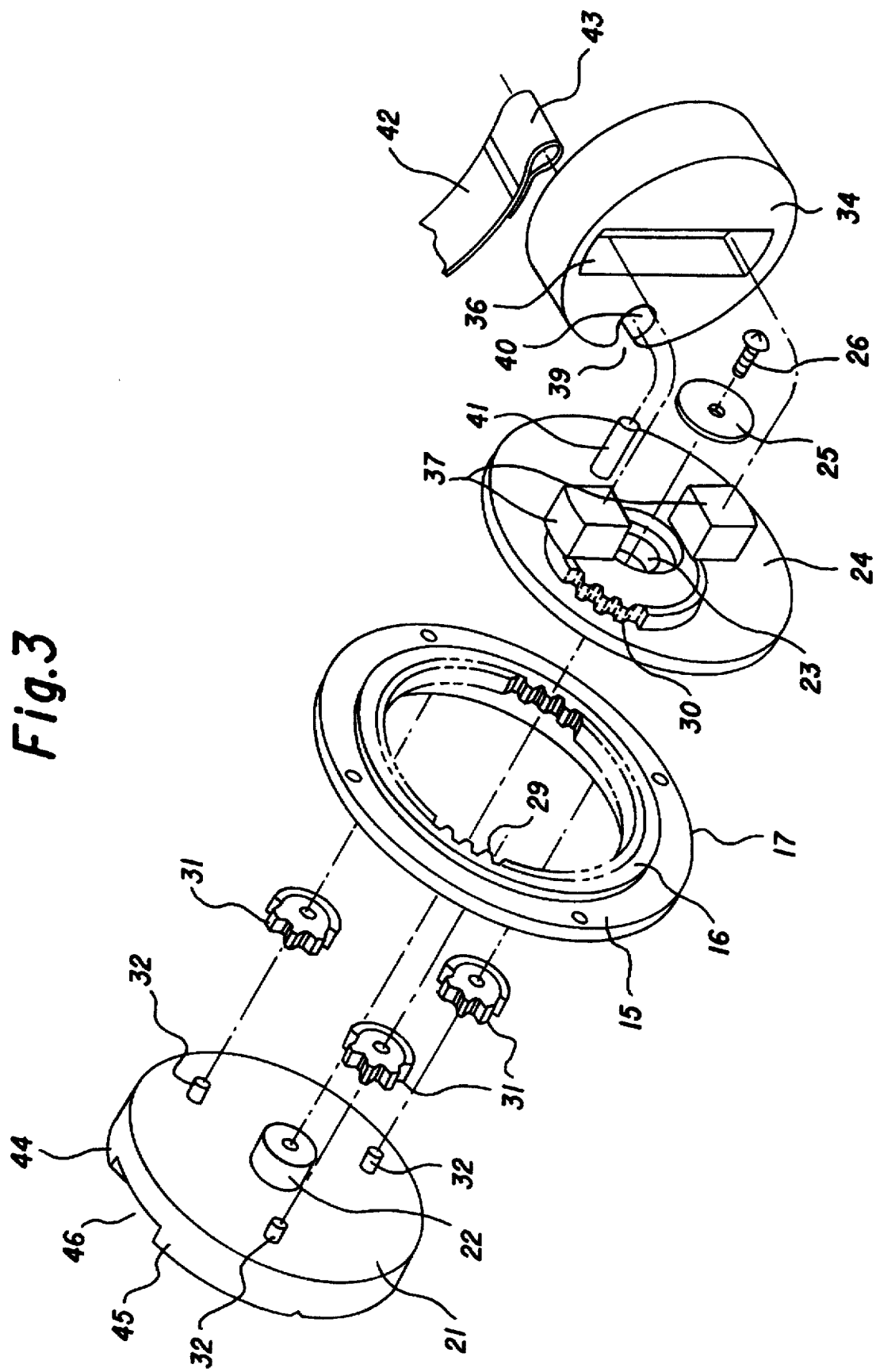
FIG. 3 is an exploded view of the major part of the tape measure of the present invention.

In an example shown in FIGS. 1 to 3, cross-shaped front and rear members 2 and 3, with a ring-like grip portion 1, are made of rigid plastics. Protruded thickening portions 7 and 8 are integrally formed inside of the ring-like grip portion 1, a lower end portion 4, and right and left side portions 5 and 6 of the front and rear members 2 and 3. The protruded thickening portions 7 and 8 are combined with each other and fixed by means of first screws 9 to form a cross-shaped frame 12, including a tape measure housing space 10 between the front and rear members 2 and 3, as well as a grip 11 on the top. A bearing supporting hole 13 and a smaller bearing hole 14 are formed on each intersection of crosses of the from and rear members 2 and 3, respectively.

Independently of the frame 12, a ring-like bearing member 17 made of rigid plastics and provided integrally with a fitting flange 15 and an inward collar portion 16 on outer and inner peripheries thereof, respectively, is inserted into the bearing supporting hole 13 from outside so as to contact an outer surface of a cut-end portion 18 of the bearing supporting hole 13 and fit the fitting flange 15 thereto from outside by means of second screws 19. A main rotary disc axis member 21, made of rigid plastics, is rotatably inserted into a larger bearing hole 20 formed on an outer surface of the inward collar portion 16 of the bearing member 17. A first short axis 22 is integrally formed in a center of an inside surface of the main rotary disc axis member 21. A sub-rotary disc axis member 24, made of rigid plastics and provided with a bearing hole 23 in a center thereof, is arranged opposingly to the main rotary disc axis member 21 in the inward collar portion 16 to fit the first short axis 22 in the bearing hole 23. Thus, the sub-rotary disc axis member 24 is rotatably fixed to the main rotary disc axis member 21 by means of an anti-departing plate 25 by screwing a third screw 26 to an end surface of the first short axis 22, thereby forming a gear box space 27 surrounded by the main and sub-rotary disc axis members 21 and 24, as well as the inward collar portion 16.

Further, an annulus 29 is formed on an inner peripheral edge portion of the collar portion 16, while a sun gear 30, which centers around the first short axis 22, is integrally formed on a side peripheral edge portion of the sub-rotary disc axis member 24 within the gear box space 27. Three planetary gears 31 are fitted by means of pin-bearing axes 32 integrally formed on a side surface of the main rotary disc axis member 21 within the gear box space 27. The planetary gears 31 are intermeshed with the annulus 29 and the sun gear 30 to rotate.

A take-up drum 34 made of rigid plastic is arranged between the sub-rotary disc axis member 24 and the rear member 3. A second short axis 35 is integrally formed at a center of the side surface of the drum 34 opposed to the rear member 3. The second short axis 35 is rotatably inserted into the smaller bearing hole 14. Further, an oblong concave portion 36 is formed on a side surface of the take-up drum 34 opposingly to the sub-rotary disc axis member 24, while separated lateral convex portions 37 are formed across a center longitudinal axis of the main rotary disc axis member 21 on a side surface of the sub-rotary disc axis member 24 opposed to the take-up drum 34. The concave portion 36 and the convex portions 37 are detachably fitted with respect to each other so that the sub-rotary disc axis member 24 and the take-up drum 34 are integrally rotated.

The take-up drum 34 has an Ω-shaped cut-off 40 with a narrower inlet 39 on an outer periphery thereof, while the sub-rotary disc axis member 24 has a catch pin 41 mounted on a side surface close to a periphery thereof to allocate in the center of the cut-off 40, thereby one end of a tape measure 42 being caught through a catch ring portion 43.

A groove 46 is formed by a pair of parallel protrusions 44 and 45 on an outer surface of the main rotary disc axis member 21, where a body portion of a take-up handle 47 is fitted to pivot thereof to the protrusions 44 and 45 flexibly by means of a pivot 48.

First, a drive unit is assembled by fitting the main rotary disc axis member 21 and the planetary gears 31 to the larger bearing hole 20 formed in the bearing member 17 and each bearing axis 32, respectively, followed by arranging the sub-rotary disc axis member 24 inside of the bearing member 17, fixing the first short axis 22 and the bearing hole 23 and screwing the anti-departing plate 25 by means of the third screw 26. The sub-rotary disc axis member 24 is then introduced in the take-up drum 34 through the bearing supporting hole 13 to fix the second short axis 35 in the smaller bearing hole 14. The drive unit is then inserted into the bearing supporting hole 13 from outside to fix the lateral convex portions 37 and the bearing member 17 to the oblong concave portion 36 and the bearing supporting hole 13, respectively, while screwing thereof by means of the second screws 19.

Disassembling of the drive unit can be conducted in a manner described above, except in reverse.

Preferably, the tape measure 42 is conveniently attached to the catch pin 41 while the drive unit is inserted into the bearing supporting hole 13.

What is claimed is:

1. A tape measure which comprises:

a tape capable of being utilized to measure a distance;

a frame including a tape measure housing space between front and rear members thereof and having a bearing supporting hole in said front member and a smaller bearing hole in said rear member formed opposingly;

a ring-like bearing member formed independently of said frame and provided with a fitting flange and an inward collar portion which are formed integrally on outer and inner peripheries thereof, respectively, said bearing member being inserted into said bearing supporting hole from outside of said front member so as to fit said fitting flange to an outer surface of a cut-end portion of said front member by means of second screws;

a main rotary disc axis member provided with a take-up handle fitted on an outside surface of said main rotary disc axis member and a first short axis integrally formed in a center of an inside surface of said main rotary disc axis member, said first short axis being rotatably inserted into a larger bearing hole formed in an outer surface of said inward collar portion of said bearing member;

a sub-rotary disc axis member provided with a bearing hole in a center thereof and arranged opposingly to said main rotary disc axis member and in said inward collar portion to fit said first short axis in said bearing hole of said sub-rotary disc axis member, said sub rotary disc axis member being rotatably fixed to said main rotary disc axis member by means of an anti-departing plate by a third screw screwed into an end surface of said first short axis, thereby forming a gear box space surrounded by said main and said sub-rotary disc axis members as well as said inward collar portion;

an annulus formed on an inner peripheral edge portion of said collar portion and a sun gear positioned around said first short axis integrally formed on a side peripheral edge portion of said sub-rotary disc axis member within said gear box space;

plural planetary gears fitted by means of bearing axes integrally formed on said inside surface of said main rotary disc axis member within said gear box space, said planetary gears being intermeshed with said annulus and said sun gear to rotate;

a take-up drum having said tape thereon arranged between said sub-rotary disc axis member and said rear member and provided with a second short axis integrally formed at a center of a side surface of said drum positioned opposingly to said rear member, said second short axis being rotatably inserted into said smaller bearing hole; and an oblong concave portion formed on a side surface of said take-up drum opposingly to said sub-rotary disc axis member and separated lateral convex portions formed on opposing sides of a central longitudinal axis of said main rotary disc axis member on a side surface of said sub-rotary disc axis member opposingly to said take-up drum, said convex portions being fitted detachably within said concave portion.

* * * * *